US009475950B2

(12) United States Patent
Umebayashi

(10) Patent No.: US 9,475,950 B2
(45) Date of Patent: Oct. 25, 2016

(54) RADIATION-CURABLE INKJET INK SET AND INKJET RECORDING METHOD

(71) Applicant: FUJIFILM Corporation, Tokyo (JP)

(72) Inventor: Tsutomu Umebayashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 87 days.

(21) Appl. No.: 14/472,763

(22) Filed: Aug. 29, 2014

(65) Prior Publication Data

US 2014/0368591 A1 Dec. 18, 2014

Related U.S. Application Data

(63) Continuation of application No. PCT/JP2013/055425, filed on Feb. 28, 2013.

(30) Foreign Application Priority Data

Mar. 9, 2012 (JP) ................. 2012-053067

(51) Int. Cl.

| B41J 2/21 | (2006.01) |
|---|---|
| C09D 11/322 | (2014.01) |
| C09D 11/101 | (2014.01) |
| C09D 11/40 | (2014.01) |
| C09D 133/12 | (2006.01) |
| C09D 183/04 | (2006.01) |
| C09D 11/38 | (2014.01) |

(52) U.S. Cl.
CPC ............ *C09D 11/322* (2013.01); *B41J 2/2107* (2013.01); *C09D 11/101* (2013.01); *C09D 11/38* (2013.01); *C09D 11/40* (2013.01); *C09D 133/12* (2013.01); *C09D 183/04* (2013.01)

(58) Field of Classification Search
CPC ............ B41J 2/01; B41J 2/0057; B41J 2/05; B41J 2/1433; B41J 2/17; B41J 2/1755; B41J 2/17503; B41J 2/17593; B41J 2/21; B41J 2/211; B41J 2/2107; B41J 2/2114; B41J 2/2117; B41J 2/2056; B41J 11/0015; B41J 11/002; B41J 3/60; B41M 5/0011; B41M 5/0017; B41M 5/0256; B41M 5/52; B41M 5/5218; B41M 7/00; B41M 7/0072; B41M 7/0081; B41M 7/009; C09D 11/005; C09D 11/30; C09D 11/32; C09D 11/322; C09D 11/328; C09D 11/36; C09D 11/38; C09D 11/40; C09D 11/52; C09D 11/54; C09D 11/101

USPC ...................... 347/9–22, 56, 86, 88, 95–105; 106/31.13, 31.27, 31.6, 31.85, 31.77, 106/31.75; 523/160, 161
See application file for complete search history.

(56) References Cited

U.S. PATENT DOCUMENTS

| 2007/0042144 A1* | 2/2007 | Teensma ................. B29C 33/14 428/34.2 |
|---|---|---|
| 2007/0125263 A1 | 6/2007 | Weber et al. |
| 2009/0118388 A1 | 5/2009 | Naruse et al. |
| 2009/0233062 A1* | 9/2009 | Nakamura ................. C08F 8/00 428/195.1 |
| 2010/0203262 A1 | 8/2010 | Umebayashi |
| 2012/0026235 A1* | 2/2012 | Hayata ................. C09D 11/101 347/20 |
| 2012/0052257 A1* | 3/2012 | Kyota ...................... C09D 4/00 428/195.1 |

FOREIGN PATENT DOCUMENTS

| CN | 101432374 A | 5/2009 |
|---|---|---|
| JP | 2005-105225 A | 4/2005 |
| JP | 2007-063521 A | 3/2007 |
| JP | 2007-514804 A | 6/2007 |
| JP | 2008-208189 A | 9/2008 |
| JP | 2010-180376 A | 8/2010 |
| JP | 2012-012539 A | 1/2012 |
| WO | 2007/029448 A1 | 3/2007 |
| WO | 2007/126103 A1 | 11/2007 |

OTHER PUBLICATIONS

Formulation Additives by BASF, BASF, pp. 10 and 11, No Date.*
The First Office Action issued by the Chinese Patent Office on May 21, 2015, which corresponds to Chinese Patent Application No. 201380013149.7 and is related to U.S. Appl. No. 14/472,763.
International Search Report; PCT/JP2013/055425; Jun. 4, 2013.

* cited by examiner

*Primary Examiner* — Manish S Shah
(74) *Attorney, Agent, or Firm* — Studebaker & Brackett PC

(57) ABSTRACT

To provide a radiation-curable inkjet ink set that has a sufficiently wide color gamut and is excellent in terms of mechanical strength and substrate adhesion of cured ink, and an inkjet recording method employing the ink set. A radiation-curable inkjet ink set comprises a yellow ink comprising C.I. Pigment Yellow 185 at 1.5 to 2.5 mass %, and a magenta ink comprising C.I. Pigment Red 48:4 at 1.5 to 2.5 mass %.

14 Claims, No Drawings

RADIATION-CURABLE INKJET INK SET AND INKJET RECORDING METHOD

CROSS-REFERENCE TO RELATED APPLICATION

The present application is a continuation application of International Application No. PCT/JP2013/055425, filed Feb. 28, 2013, which claims priority to Japanese Patent Application No. 2012-53067 filed on Mar. 9, 2012. The contents of these applications are incorporated herein by reference in their entirety.

TECHNICAL FIELD

The present invention relates to a radiation-curable inkjet ink set and an inkjet recording method.

BACKGROUND ART

Inkjet methods, in which droplets of an ink composition are discharged from an ink discharge orifice, are used in many printers because of small size, low cost, and image formation being possible without contact with a recording medium. Among these inkjet methods, a piezo inkjet method, in which an ink is discharged by utilizing deformation of a piezo electric element, and a thermal inkjet method, in which droplets of an ink composition are discharged by utilizing the phenomenon of boiling of the ink composition by thermal energy, are characterized by being excellent in terms of high resolution and high speed printing properties.

In recent years, development of the use of inkjet printers has been carried out not only in the field of photographic printing and document printing for domestic use and office use but also in the field of commercial printing and industrial printing. In particular, the demand for wide format inkjet printers suitable for the printing of large-size advertisement posters that are to be affixed to shop windows or walls of buildings, etc. has been increasing rapidly. Since large-size advertisement posters are often used mainly outdoors and are required to have a long-term weather resistance, polyvinyl chloride, etc. is widely used as a substrate, and pigments having an azo skeleton (mainly yellow applications), quinacridone pigments (mainly magenta applications), copper phthalocyanine pigments (mainly cyan applications), and carbon black (mainly black applications), which are excellent in terms of weatherability (light, rain, and wind), are widely used as pigments.

Furthermore, for full color printing, an inkjet ink set comprising inks of each of the three subtractive primary colors, comprising yellow, magenta, and cyan or, with the addition of a black ink, inks of four colors has been used.

As conventional ink compositions, those described in Patent Documents 1 to 4 can be cited.

PRIOR ART DOCUMENTS

Patent Documents

Patent Document 1: WO 2007/029448
Patent Document 2: JP-A-2005-105225 (JP-A denotes a Japanese unexamined patent application publication)
Patent Document 3: JP-A-2010-180376
Patent Document 4: Published Japanese translation 2007-514804 of a PCT application

SUMMARY OF THE INVENTION

Problems to be Solved by the Invention

In recent years, inkjet printing has been used for printed materials not only in outdoor applications but also in indoor applications where they are placed inside shops or train stations and mainly used indoors.

The present inventors have found that an ink set used for indoor printing is required to have properties that are different from those of outdoor advertisement posters. That is, a radiation-curable inkjet ink set used for a printed material that is mainly used indoors is further required to have the following properties.

(1) Since the viewing distance between an observer and a printed material is short indoors, a wider color gamut is required than that for a conventional product.
(2) Since there are many opportunities for external forces to act on the surface of a printed material, there is a requirement to improve the mechanical strength of a cured ink and the adhesion of a cured ink to a print substrate.
(3) An inkjet ink is also required to have storage stability.
(4) Since it is used within a room, which is a confined space, there is a requirement to prevent ink from bleeding out from a print substrate.

It is an object of the present invention to provide a radiation-curable inkjet ink set that has a sufficiently wide color gamut and is excellent in terms of mechanical strength and substrate adhesion of cured ink, and an inkjet recording method employing the ink set.

Means for Solving the Problems

The object has been attained by means described in <1> or <13> below. They are listed below together with <2> to <12> and <14>, which are preferred embodiments.

Claims

<1> A radiation-curable inkjet ink set comprising a yellow ink comprising C.I. Pigment Yellow 185 at 1.5 to 2.5 mass %, and a magenta ink comprising C.I. Pigment Red 48:4 at 1.5 to 2.5 mass %, <2> the ink set according to <1>, wherein the yellow ink further comprises a polymeric dispersant having a weight-average molecular weight of 15,000 to 45,000 and an amine value of 35 to 45 mg KOH/g, <3> the ink set according to <1> or <2>, wherein the magenta ink further comprises a polymeric dispersant having a weight-average molecular weight of 15,000 to 70,000 and an amine value of 15 to 45 mg KOH/g, <4> the ink set according to <2> or <3>, wherein the polymeric dispersant in the yellow ink and/or the magenta ink has a glass transition temperature (Tg) of no greater than 25° C., <5> the ink set according to any one of <1> to <4>, wherein both the yellow ink and the magenta ink comprise at least one type of difunctional monomer selected from the group consisting of 1,6-hexanediol diacrylate (HDDA), 1,9-nonanediol diacrylate (NDDA), dipropylene glycol diacrylate (DPGDA), neopentyl glycol diacrylate (NPG-PODA), and tripropylene glycol diacrylate (TPGDA), and the sum total of the difunctional monomer is at least 40 mass % of the total amount of each color ink, <6> the ink set according to any one of <1> to <5>, wherein both the yellow ink and the magenta ink comprise at least one type of monofunctional monomer selected from the group consisting of phenoxyethyl acrylate (PEA), octadecyl acrylate (ODA), isodecyl acrylate (IDA), and cyclic trimethylolpropaneformal acrylate (CTFA), and the sum total of the monofunctional monomer is 5 to 30 mass % of the sum total of the difunctional monomer in each color ink, <7> the ink set according to any one of <1> to <6>, wherein both the yellow ink and the magenta ink comprise DPGDA and/or TPGDA as a difunctional monomer and PEA and/or CTFA as a monofunctional monomer, <8> the ink set according to any one of <1> to <7>, wherein the yellow ink and the magenta ink each further comprise a polysiloxane-based surfactant at 0.1 to 3 mass %, <9> the ink set according to any one of <1> to <8>, wherein both the yellow ink and the magenta ink comprise DPGDA and TPGDA as a difunctional monomer, <10> the ink set according to any one of <1> to <9>, wherein both the yellow ink and the magenta ink comprise CTFA as a monofunctional monomer, <11> the ink set according to any one of <1> to <10>, wherein both the yellow ink and the magenta ink comprise an inactive methyl methacrylate homopolymer and/or copolymer, <12> the ink set according to any one of <1> to <11>, wherein it is for corrugated cardboard substrate printing, <13> an inkjet recording method comprising 1) a discharge step of discharging the yellow ink and/or the magenta ink of the ink set according to any one of <1> to <12> above a substrate from an inkjet recording head, and 2) a curing step of curing the ink by irradiation with actinic radiation, and <14> the inkjet recording method according to <13>, wherein the substrate is a corrugated cardboard.

MODES FOR CARRYING OUT THE INVENTION

The radiation-curable inkjet ink set of the present invention comprises a yellow ink comprising C.I. Pigment Yellow 185 (hereinafter, also called 'PY 185') at 1.5 to 2.5 mass %, and a magenta ink comprising C.I. Pigment Red 48:4 (hereinafter, also called 'PR 48:4') at 1.5 to 2.5 mass %.

The ink set of the present invention comprises the yellow ink and the magenta ink as essential inks, and as necessary preferably comprises a radiation-curable cyan ink and/or black ink.

The present invention is explained in detail below.

In the specification, the notation 'lower limit to upper limit' means 'at least the lower limit but no greater than the upper limit', and the notation 'upper limit to lower limit' means 'no greater than the upper limit but at least the lower limit'. That is, it means a numerical range that includes the upper limit and the lower limit. The 'molecular weight' of a polymer compound means a 'weight-average molecular weight' unless otherwise specified. Furthermore, 'parts by mass' and 'mass %' have the same meanings as those of 'parts by weight' and 'wt %' respectively.

(1) Radiation-Curable Inkjet Ink Set

In the present invention, the 'ink' means an 'ink composition' and comprises a radiation-curable compound in addition to a colored pigment, and the 'ink set' comprises as essential colored inks a yellow ink comprising PY 185 as a yellow pigment and a magenta ink comprising PR 48:4 as a magenta pigment and may comprise another color ink as an optional component.

Furthermore, in the ink set of the present invention, both the yellow ink and the magenta ink are radiation curable and are suitably used as an ink composition for inkjet recording.

In the ink set of the present invention, both the yellow ink and the magenta ink are ink compositions that can cure upon exposure to radiation and are also oil-based ink compositions.

The 'radiation' referred to in the present invention is not particularly limited as long as it is actinic radiation that can provide energy that enables an initiating species to be generated in the ink when irradiated, and broadly includes α rays, γ rays, X rays, ultraviolet rays (UV), visible light, and an electron beam; among these, ultraviolet rays and an electron beam are preferable from the viewpoint of curing sensitivity and the availability of equipment, and ultraviolet rays are particularly preferable. The each color ink in the ink set of the present invention is therefore preferably an ink composition that can cure upon exposure to ultraviolet rays as radiation.

When both or either of 'acrylate' and 'methacrylate' are referred to, it might be expressed as '(meth)acrylate', and when both or either of 'acryl' and 'methacryl' are referred to, it might be expressed as '(meth)acryl'.

(Yellow Pigment)

The radiation-curable inkjet ink set related to the present invention comprises a yellow ink comprising C.I. Pigment Yellow 185 at 1.5 to 2.5 mass %. The content of C.I. Pigment Yellow 185 is preferably 1.6 to 2.2 mass % relative to the total amount of yellow ink. The ink set of the present invention comprising, in combination with the normal yellow ink having the above pigment content, a yellow ink having a smaller content than this range as a light color ink is not excluded.

As PY 185 a product type that gives a dispersion having a particle size distribution of at least 0.1 μm but no greater than 0.3 μm for a $D_{V90}$ particle size measured by laser diffractometry may suitably be used. When there is this particle size distribution, the inkjet discharge stability is excellent, and flowability in the above pigment concentration range is good. As a commercial product, Paliotol Yellow D 1155 or Paliotol Yellow L 1155 from BASF may preferably be used.

Here, the dispersion is one formed by medium dispersion using zirconia beads as described in the Examples, and the laser diffractometry is in accordance with a standard method.

The yellow ink preferably comprises PY 185 as the yellow pigment in an amount of at least 80 mass % of the entire yellow pigment, more preferably at least 90 mass %, and particularly preferably at least 99 mass %.

As the yellow pigment that may be used in combination as a low level component in the yellow ink used in the present invention, the pigments below can be cited as examples. In the present invention, when these pigments other than PY 185 are used in combination, the content thereof is preferably less than 20 mass %, more preferably less than 10 mass %, yet more preferably less than 1 mass %, and particularly preferably none, that is, none being contained.

Specific examples of the organic pigment and the inorganic pigment that can be used with PY 185 in the present invention include, as those exhibiting a yellow color, monoazo pigments such as C.I. Pigment Yellow 1 (Fast Yellow G, etc.) and C.I. Pigment Yellow 74, disazo pigments such as C.I. Pigment Yellow 12 (Disazo Yellow AAA, etc.) and C.I. Pigment Yellow 17, benzidine-free azo pigments such as C.I. Pigment Yellow 180, azo lake pigments such as C.I. Pigment Yellow 100 (Tartrazine Yellow Lake, etc.), condensed azo pigments such as C.I. Pigment Yellow 95 (Azo Condensation Yellow GR, etc.), acidic dye lake pigments such as C.I. Pigment Yellow 115 (Quinoline Yellow Lake, etc.), benzimidazolone pigments such as and C.I. Pigment Yellow 120 (Novoperm Yellow 2HG), basic dye lake pigments such as C.I. Pigment Yellow 18 (Thioflavine Lake, etc.), anthraquinone pigments such as Flavanthrone Yellow (Y-24), isoindolinone pigments such as Isoindolinone Yellow 3RLT (Y-110), quinophthalone pigments such as Quinophthalone Yellow (Y-138), isoindoline pigments such as Isoindoline Yellow (Y-139), nitroso pigments such as C.I. Pigment Yellow 153 (Nickel Nitroso Yellow, etc.), and metal complex azomethine pigments such as C.I. Pigment Yellow 117 (Copper Azomethine Yellow, etc.).

(Magenta Pigment)

The radiation-curable inkjet ink set related to the present invention comprises a magenta ink comprising C.I. Pigment Red 48:4 at 1.5 to 2.5 mass %. The content of C.I. Pigment Red 48:4 is preferably 1.8 to 2.5 mass % relative to the total amount of magenta ink. The ink set of the present invention comprising, in combination with the normal magenta ink having the above pigment content, a magenta ink having a smaller content than this range as a light color magenta ink is not excluded.

As PR 48:4 a product type that gives a dispersion having a particle size distribution of at least 0.15 µm but no greater than 0.35 µm for a $D_{r90}$ particle size measured by laser diffractometry may suitably be used. When there is this particle size distribution, the inkjet discharge stability is excellent, and the flowability in the above pigment concentration range is good. As commercial products, Irgalite Red FBL (BASF), Novoperm Red 5BLS (Clariant), and Novoperm Red BLS 02 (Clariant) may preferably be used.

Here, the dispersion is one formed by medium dispersion using zirconia beads as described in the Examples, and the laser diffractometry is in accordance with a standard method.

The magenta ink preferably comprises PR 48:4 as the magenta pigment in an amount of at least 80 mass % of the entire magenta pigment, more preferably at least 90 mass %, and particularly preferably at least 99 mass %.

As the red or magenta pigment that may be used in combination as a low level component in the magenta ink used in the present invention, the pigments below can be cited as examples. In the present invention, when these pigments other than PR 48:4 are used in combination, the content thereof is preferably less than 20 mass %, more preferably less than 10 mass %, yet more preferably less than 1 mass %, and particularly preferably none, that is, none being contained.

Examples of pigments exhibiting a red or magenta color include monoazo pigments such as C.I. Pigment Red 3 (Toluidine Red, etc.), disazo pigments such as C.I. Pigment Red 38 (Pyrazolone Red B, etc.), azo lake pigments such as C.I. Pigment Red 53:1 (Lake Red C, etc.) and C.I. Pigment Red 57:1 (Brilliant Carmine 6B), condensed azo pigments such as C.I. Pigment Red 144 (Azo Condensation Red BR, etc.), acidic dye lake pigments such as C.I. Pigment Red 174 (Phloxine B Lake, etc.), basic dye lake pigments such as C.I. Pigment Red 81 (Rhodamine 6G' Lake, etc.), anthraquinone pigments such as C.I. Pigment Red 177 (Dianthraquinonyl Red, etc.), thioindigo pigments such as C.I. Pigment Red 88 (Thioindigo Bordeaux, etc.), perinone pigments such as C.I. Pigment Red 194 (Perinone Red, etc.), perylene pigments such as C.I. Pigment Red 149 (Perylene Scarlet, etc.), quinacridone pigments such as C.I. Pigment violet 19 (unsubstituted quinacridone) and C.I. Pigment Red 122 (Quinacridone Magenta, etc.), isoindolinone pigments such as C.I. Pigment Red 180 (Isoindolinone Red 2BLT, etc.), and alizarin lake pigments such as C.I. Pigment Red 83 (Madder Lake, etc.).

(Cyan Pigment and Black Pigment)

When the ink set of the present invention is used for full color printing, it is preferable to use a cyan ink and a black ink in combination with the yellow ink and the magenta ink, and in such cyan and black inks the pigments listed as examples below may be used.

Examples of pigments exhibiting a blue or cyan color include disazo pigments such as C.I. Pigment Blue 25 (Dianisidine Blue, etc.), phthalocyanine pigments such as C.I. Pigment Blue 15 (Phthalocyanine Blue, etc.), acidic dye lake pigments such as C.I. Pigment Blue 24 (Peacock Blue Lake, etc.), basic dye lake pigments such as C.I. Pigment Blue 1 (Victoria Pure Blue BO Lake, etc.), anthraquinone pigments such as C.I. Pigment Blue 60 (Indanthrone Blue, etc.), and alkali blue pigments such as C.I. Pigment Blue 18 (Alkali Blue V-5:1).

Examples of pigments exhibiting a black color include carbon black, titanium black, and aniline black, and carbon black is preferable.

With regard to the ink set of the present invention, depending on the intended application, an ink having another hue may be selected from the group below and used. That is, examples of the other hue ink include a white ink, an orange ink, a violet ink, a green ink, and a clear ink. The radiation-curable inkjet ink set of the present invention is preferably formed from four colors, that is, a cyan ink and a black ink in addition to the magenta ink comprising PR 48:4 as a pigment and the yellow ink comprising PY 185 as a pigment, and it may be formed, with the addition of a white ink, from five colors.

As hereinbefore described, the ink set of the present invention may comprise as necessary a so-called special color ink such as green, violet, or orange as a colored ink in addition to the three subtractive primary colors of yellow, magenta, and cyan.

Examples of pigments exhibiting a green color include phthalocyanine pigments such as C.I. Pigment Green 7 (Phthalocyanine Green) and C.I. Pigment Green 36 (Phthalocyanine Green), and azo metal complex pigments such as C.I. Pigment Green 8 (Nitroso Green).

Examples of pigments exhibiting an violet color include quinacridone pigments such as C.I. Pigment violet 19 (unsubstituted quinacridone).

Examples of pigments exhibiting an orange color include isoindoline pigments such as C.I. Pigment Orange 66 (Isoindoline Orange) and anthraquinone pigments such as C.I. Pigment Orange 51 (Dichloropyranthrone Orange).

(Pigment Dispersant)

In the ink set of the present invention, it is preferable for the yellow ink and the magenta ink to each further comprise a polymeric dispersant. The polymeric dispersant is explained below.

(Dispersant for Yellow Ink)

The yellow ink preferably further comprises a polymeric dispersant (basic polymeric dispersant) having a molecular weight of 15,000 to 45,000 and having an amine value of 35 to 45 mg KOH/g.

Due to the use of a dispersant having physical properties as described above, good flowability during and after dispersion of a pigment and excellent long-term ink storage stability can be obtained. In particular, from the viewpoint of obtaining excellent long-term ink storage stability, a particularly preferred dispersant is an acrylic block copolymer having a molecular weight of 20,000 to 25,000 and an amine value of 38 to 42 mg KOH/g.

In order to obtain a wide color gamut, the glass transition temperature of the dispersant is preferably no greater than 25° C., and the melting point of the dispersant is particularly preferably no greater than 25° C. It is surmised that the effect of the glass transition temperature/melting point of the dispersant on the color reproducibility is as follows. In order to obtain a wider color gamut, it is preferable for a fired ink droplet to spread as widely as possible above an ink film of fired and cured droplets. A high concentration of dispersant is present on the surface of the ink film of fired and cured droplets (based on cutting TOF-SIMS analysis), and it is surmised that an ink droplet spreads more widely when the dispersant at room temperature (about 25° C.) has flowability (glass transition temperature being no greater than 25° C.).

In order to obtain good flowability during and after dispersion of a pigment and excellent long-term ink storage stability, the concentration of the basic polymeric dispersant contained in the yellow ink is preferably 20 to 50 mass % relative to the weight of PY 185, and more preferably 25 to 45 mass %.

The basic polymeric dispersant may be obtained as a commercial product or may be synthesized by a method known to a person skilled in the art.

The yellow ink preferably comprises a specific polymeric dispersant having at least a basic group.

Examples of the basic group include an amino group, an imino group, an amide group, an imide group, and a nitrogen-containing heterocyclic group. Furthermore, the polymeric dispersant may have the basic group in a main chain or a side chain of the polymeric dispersant or may have it in both thereof.

The polymeric dispersant suitably used for the PY 185 pigment preferably has an amine value of at least 35 mg KOH/g but no greater than 45 mg KOH/g, and more preferably 38 to 42 mg KOH/g. When the amine value is within this range, the storage stability of the yellow ink improves.

The amine value is measured by the procedure below. A dispersant is dissolved in methyl isobutyl ketone, potentiometric titration is carried out using a 0.01 mole/L methyl isobutyl ketone solution of a perchlorate, and the amine value is defined as one calculated on a mg KOH/g basis. The potentiometric titration is carried out using a COM-1500 automatic titration apparatus manufactured by Hiranuma Sangyo Corporation.

With regard to the molecular weight of the basic polymeric dispersant, from the viewpoint of dispersion stability and dispersion flowability, the weight-average molecular weight is preferably 15,000 to 50,000, and particularly preferably 20,000 to 25,000.

The basic polymeric dispersant is preferably an acrylic block copolymer.

The dispersant of the yellow ink is particularly preferably an acrylic block copolymer having an amine value of 38 to 42 mg KOH/g and a weight-average molecular weight of 20,000 to 25,000.

A dispersant having physical properties as above may be obtained as a commercial product from Ajinomoto-Fine-Techno Co., Inc., Evonik (TEGO Dispers series), BYK (DISPERBYK series, BYK series), BASF (EFKA series), Lubrizol (Solsperse series), etc. Since the amine value might vary depending on the production lot of the pigment, it is preferable to use it after confirming that the amine value is in a desired range.

Taking into consideration the variation of physical properties between production lots, as the polymeric dispersant of the yellow ink the product types shown in the table below are particularly preferably used.

TABLE 1

| Dispersant name | Supply source | Amine value mg KOH/g | Tg |
|---|---|---|---|
| EFKA 7701 | BASF | 40.0 | <25° C. |
| TEGO Dispers 685 | Evonik | 37.4 | <25° C. |
| BYK168 | BYK | 33.2 | >25° C. |

As a commercial product that can be used as the polymeric dispersant for the yellow ink, EFKA 7701 (amine value 40.0 mg KOH/g) supplied from BASF can be preferably cited as an example.

(Dispersant for Magenta Ink)

The magenta ink preferably further comprises a polymeric dispersant having a molecular weight of 15,000 to 70,000 and an amine value of 15 to 45 mg KOH/g (basic polymeric dispersant). Due to the use of a dispersant having the above physical properties, good flowability during and after dispersion of a pigment and excellent long-term ink storage stability can be obtained. From the viewpoint of obtaining long-term ink storage stability, the polymeric dispersant particularly preferably has a molecular weight of 20,000 to 70,000 and an amine value of 25 to 45 mg KOH/g.

Furthermore, in order to obtain good flowability during and after dispersion of a pigment and excellent long-term ink storage stability, the concentration of the basic polymeric dispersant contained in the magenta ink is preferably 20 to 60 mass % relative to the weight of PR 48:4, and particularly preferably 25 to 45 mass %.

This basic polymeric dispersant is preferably an acrylic polymer, more preferably a random copolymer, and yet more preferably an acrylic graft copolymer.

The basic polymeric dispersant may also be synthesized by a method known to a person skilled in the art.

The magenta ink also preferably comprises a specific polymeric dispersant having at least a basic group.

Examples of the basic group include an amino group, an imino group, an amide group, an imide group, and a nitrogen-containing heterocyclic group, as described above. Furthermore, the polymeric dispersant may have the basic group in a main chain or a side chain of the polymeric dispersant or may have it in both thereof.

The basic polymeric dispersant for the PR 48:4 magenta pigment is preferably a dispersant having an amine value of at least 15 mg KOH/g but no greater than 45 mg KOH/g, more preferably 25 to 45 mg KOH/g, and particularly preferably 25 to 38 mg KOH/g. When the amine value is within this range, long-term storage stability of the magenta ink is obtained.

The amine value is measured by the procedure above.

A dispersant having physical properties as above may be obtained as a commercial product from Ajinomoto-Fine-Techno Co., Inc., Evonik (TEGO Dispers series), BYK (DISPERBYK series, BYK series), BASF (EFKA series), Lubrizol (Solsperse series), etc. Since the amine value might vary depending on the production lot of the pigment, it is similarly preferable to use it after confirming that the amine value is in a desired range.

Commercial products that can be used as the polymeric dispersant for the magenta ink are cited below as examples.

TABLE 2

| Dispersant name | Supply source | Amine value mg KOH/g | Tg |
|---|---|---|---|
| EFKA 7701 | BASF | 40.0 | <25° C. |
| TEGO Dispers 685 | Evonik | 37.4 | <25° C. |
| BYK168 | BYK | 33.2 | >25° C. |
| EFKA 7731 | BASF | 25.1 | <25° C. |

The polymeric dispersant contained in the yellow ink and the magenta ink preferably has a glass transition temperature of no greater than 25° C. When the glass transition temperature thereof is in this temperature range, excellent ink dispersion stability and a wide color gamut can be obtained.

In order to obtain a good color gamut, the glass transition temperature of the dispersant is preferably no greater than 25° C. It is surmised that the effect of the glass transition temperature of the dispersant on color reproducibility is as follows. In order to obtain a wide color gamut, it is preferable for a fired ink droplet to spread as widely as possible above a substrate or an ink film of fired and cured droplets. It is surmised that a high concentration of dispersant is present on the surface of the ink film of fired and cured droplets (based on cutting TOF-SIMS analysis), and when the dispersant has flowability at room temperature (around 25° C.) (the glass transition temperature being no greater than 25° C.), the ink droplets spread further.

The glass transition temperature (Tg) may be determined in accordance with ASTMD3418-8 from a main maximum peak measured using a differential scanning calorimeter (DSC-7, Perkin Elmer). Temperature correction for a detection section of this apparatus (DSC-7) employs the melting points of indium and zinc, and calorific correction employs the heat of fusion of indium. A sample is used in an aluminum pan, and an empty pan is set as a control. The temperature is increased at a rate of temperature increase of 10° C./min, held at 150° C. for 5 minutes, decreased from 150° C. to 0° C. at −10° C./min using liquid nitrogen, held at 0° C. for 5 minutes, and increased again from 0° C. to 150° C. at 10° C./min, and a determination is carried out based on the onset temperature analyzed from the endothermic curve at the time of the 2nd temperature increase.

(Ethylenically Unsaturated Compound)

The yellow ink and the magenta ink contained in the ink set of the present invention are both radiation curable. In order to impart radiation curability, both of the inks comprise a radiation-curable compound. When the cyan ink and/or the black ink are used in combination with both of the inks, these inks also are preferably radiation curable.

Both the yellow ink and the magenta ink may comprise, as a radiation-curable compound, a cationically polymerizable cyclic ether (an epoxy compound, an oxetane compound, etc.), and preferably a radically polymerizable ethylenically unsaturated compound. As the ethylenically unsaturated compound, it is preferable to use in combination a monofunctional monomer having only one ethylenically unsaturated group in the molecule and a difunctional monomer having two ethylenically unsaturated groups in the molecule. In addition thereto, a polyfunctional monomer having three or more ethylenically unsaturated groups in the molecule may also be used as appropriate.

<Difunctional Monomer>

The present inventors have found that the yellow ink and the magenta ink contained in the ink set of the present invention preferably comprise a predetermined amount of difunctional monomer selected from the group of specific compounds in order to obtain suppressed odor of a cured ink, good inkjet suitability, and excellent cured film strength.

In indoor printing, to which the ink set of the present invention is suitably applied, it is preferable to suppress the odor of a cured film. One of the causes of odor is residual monomer in a cured film. Therefore, it is preferable to select one from the group of specific polymerizable monomers that have a high molecular weight and suppressed volatility of residual monomer.

That is, both the yellow ink and the magenta ink preferably comprise at least one type of difunctional monomer selected from the group consisting of 1,6-hexanediol diacrylate (HDDA), 1,9-nonanediol diacrylate (NDDA), dipropylene glycol diacrylate (DPGDA), neopentyl glycol diacrylate (NPGPODA), and tripropylene glycol diacrylate (TPGDA), and the sum total of difunctional monomer is at least 40 mass % of the entire amount of each ink, more preferably 40 to 80 mass %, and particularly preferably 45 to 70 mass %.

The difunctional monomers contained in the yellow ink and the magenta ink may be identical to or different from each other, but are preferably identical.

In the ink set of the present invention, it is preferable for both the yellow ink and the magenta ink to be substantially free of difunctional monomers other than the specific difunctional monomers. Here, 'substantially' means no greater than 10 mass % of the entire difunctional monomer, and preferably no greater than 1 mass %.

In the present invention, the yellow ink and the magenta ink more preferably comprise DPGDA and/or TPGDA as a difunctional monomer, and particularly preferably comprise DPGDA and TPGDA.

<Monofunctional Monomer>

The present inventors have found that the yellow ink and the magenta ink contained in the ink set of the present invention preferably comprise a predetermined amount of monofunctional monomer selected from the group of specific compounds in order to obtain storage stability for a cured ink. That is, both the yellow ink and the magenta ink preferably comprise at least one type of monofunctional monomer selected from the group consisting of phenoxyethyl acrylate (PEA), octadecyl acrylate (ODA), isodecyl acrylate (IDA), and cyclic trimethylolpropaneformal acrylate (CTFA), and the sum total of the monofunctional monomer in each color ink is 5 to 30 mass % relative to the sum total of the difunctional monomer.

It is more preferable for them to comprise PEA and/or CTFA as a monofunctional monomer, and it is yet more preferable for them to comprise PEA and CTFA.

Due to its low viscosity, PEA is also preferably used as a dispersing medium when dispersing a pigment.

Each color ink used in the ink set of the present invention is preferably a solvent-free ink, that is, does not contain any volatile solvent.

In the ink set of the present invention, both the yellow ink and the magenta ink are preferably substantially free of monofunctional monomers other than the specific four types of monofunctional monomers. Here, 'substantially free of' means comprising no greater than 10 mass % of the entire monofunctional monomer, and preferably no greater than 1 mass %.

The ink composition contained in the ink set of the present invention preferably comprises as a difunctional monomer dipropylene glycol diacrylate (DPGDA) and/or tripropylene glycol diacrylate (TPGDA).

It is more preferable for it to comprise as a difunctional monomer DPGDA and/or TPGDA and for it to further comprise as a monofunctional monomer PEA and/or CTFA. It is particularly preferably for it to comprise as difunctional monomers DPGDA and TPGDA and for it to further comprise as monofunctional monomers PEA and CTFA.

In the explanation below, when both or either one of 'acrylate' and 'methacrylate' are referred to, the term '(meth)acrylate' is used, and when both or either one of 'acryloxy' and 'methacryloxy' are referred to, the term '(meth)acryloxy' is used.

In the present invention, examples of the monofunctional ethylenically unsaturated compound that can be used in combination include monofunctional (meth)acrylate compounds such as 2-(2-ethoxyethoxy)ethyl (meth)acrylate, norbornyl (meth)acrylate, isobornyl (meth)acrylate, isophoryl (meth)acrylate, 3,3,5-trimethylcyclohexyl (meth)acrylate, 2-ethylhexyl (meth)acrylate, 2-hydroxyethyl (meth)acrylate, butoxyethyl (meth)acrylate, carbitol (meth)acrylate, cyclohexyl (meth)acrylate, tetrahydrofurfuryl (meth)acrylate, benzyl (meth)acrylate, methyl (meth)acrylate, n-butyl (meth)acrylate, decyl (meth)acrylate, lauryl (meth)acrylate, allyl (meth)acrylate, glycidyl (meth)acrylate, and dimethylaminomethyl (meth)acrylate.

In the present invention, preferred examples of the polyfunctional ethylenically unsaturated compound that can be used in combination include ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tetrapropylene glycol di(meth)acrylate, polypropylene glycol di(meth)acrylate, neopentyl glycol di(meth)acrylate, ethoxylated neopentyl glycol diacrylate, propoxylated neopentyl glycol diacrylate, pentaerythritol tri(meth)acrylate, pentaerythritol tetra(meth)acrylate, dipentaerythritol tetra(meth)acrylate, trimethylolethane tri(meth)acrylate, trimethylolpropane tri(meth)acrylate, tetramethylolmethane tetra(meth)acrylate, bis(4-(meth)acryloxypolyethoxyphenyl)propane, oligoester (meth)acrylate, and 2,2-bis(4-(meth)acryloxypolyethoxyphenyl)propane.

More specifically, commercially available or industrially known radically polymerizable or crosslinking monomers, oligomers, and polymers, such as those described in 'Kakyozai Handobukku' (Crosslinking Agent Handbook), Ed. S. Yamashita (Taiseisha, 1981); 'UV/EB Koka Handobukku (Genryo)' (UV/EB Curing Handbook (Starting Materials)) Ed. K. Kato (Kobunshi Kankoukai, 1985); 'UV/EB Koka Gijutsu no Oyo to Shijyo' (Application and Market of UV/EB Curing Technology), p. 79, Ed. RadTech (CMC, 1989); and E. Takiyama 'Poriesuteru Jushi Handobukku' (Polyester Resin Handbook), (The Nikkan Kogyo Shimbun Ltd., 1988) may be used.

The molecular weight of the ethylenically unsaturated compound is preferably 80 to 2,000, more preferably 80 to 1,000, and yet more preferably 80 to 800.

The ink composition preferably comprises an oligomer having an ethylenically unsaturated group. The ethylenically unsaturated group is preferably radically polymerizable ethylenically unsaturated group, and more preferably a (meth)acryloxy group.

The oligomer having an ethylenically unsaturated group in the present invention may be any oligomer, and examples thereof include an olefin-based oligomer (an ethylene oligomer, a propylene oligomer, a butene oligomer, etc.), a vinyl-based oligomer (a styrene oligomer, a vinyl alcohol oligomer, a vinylpyrrolidone oligomer, an acrylate oligomer, a methacrylate oligomer, etc.), a diene-based oligomer (a butadiene oligomer, a chloroprene rubber, a pentadiene oligomer, etc.), a ring-opening polymerization type oligomer (di-, tri-, tetra-ethylene glycol, polyethylene glycol, polyethylimine, etc.), an addition-polymerization type oligomer (an oligoester acrylate, a polyamide oligomer, a polyisocyanate oligomer), and an addition-condensation oligomer (a phenolic resin, an amino resin, a xylene resin, a ketone resin, etc.), having an ethylenically unsaturated group. Among them an oligoester (meth)acrylate is preferable, and among them a urethane (meth)acrylate, a polyester (meth)acrylate, and an epoxy (meth)acrylate are preferable, and a urethane (meth)acrylate is more preferable.

As the urethane (meth)acrylate, an aliphatic urethane (meth)acrylate and an aromatic urethane (meth)acrylate may preferably be cited, and an aliphatic urethane (meth)acrylate may more preferably be cited.

Furthermore, the urethane (meth)acrylate is preferably a tetra- or lower-functional urethane (meth)acrylate, and more preferably a di- or lower-functional urethane (meth)acrylate.

In accordance with a urethane (meth)acrylate being contained, an ink composition having excellent adhesion to a substrate and excellent curability is obtained.

With respect to the oligomer, 'Origomar Handobukku (Oligomer Handbook)' (edited by Junji Furukawa, The Chemical Daily Co., Ltd.) may also be referred to.

As oligomer commercial products, examples of urethane (meth)acrylates include R1204, R1211, R1213, R1217, R1218, R1301, R1302, R1303, R1304, R1306, R1308, R1901, and R1150 manufactured by Dai-Ichi Kogyo Seiyaku Co., Ltd., the EBECRYL series (e.g. EBECRYL 230, 270, 4858, 8402, 8804, 8807, 8803, 9260, 1290, 1290K, 5129, 4842, 8210, 210, 4827, 6700, 4450, and 220) manufactured by Daicel-Cytec Company Ltd., NK Oligo U-4HA, U-6HA, U-15HA, U-108A, and U200AX manufactured by Shin-Nakamura Chemical Co., Ltd., and Aronix M-1100, M-1200, M-1210, M-1310, M-1600, and M-1960 manufactured by Toagosei Co., Ltd., CN964 and A85 manufactured by Sartomer.

Examples of polyester (meth)acrylates include the EBECRYL series (e.g. EBECRY L770, IRR467, 81, 84, 83, 80, 675, 800, 810, 812, 1657, 1810, IRR302, 450, 670, 830, 870, 1830, 1870, 2870, IRR267, 813, IRR483, 811, etc.) manufactured by Daicel-Cytec Company Ltd. and Aronix M-6100, M-6200, M-6250, M-6500, M-7100, M-8030, M-8060, M-8100, M-8530, M-8560, and M-9050 manufactured by Toagosei Co., Ltd.

Examples of epoxy (meth)acrylates include the EBECRYL series (e.g. EBECRYL 600, 860, 2958, 3411, 3600, 3605, 3700, 3701, 3703, 3702, 3708, RDX63182, 6040, etc.) manufactured by Daicel-Cytec Company Ltd.

With regard to the oligomer having an ethylenically unsaturated group, one type thereof may be used on its own or two or more types may be used in combination.

The content of the oligomer having an ethylenically unsaturated group in the ink composition of the present invention is, relative to the total weight of the ink composition, preferably 0.1 to 50 wt %, more preferably 0.5 to 20 wt %, and yet more preferably 1 to 10 wt %.

The total content of the ethylenically unsaturated compounds in the ink composition is, relative to the total weight of the ink composition, preferably 50 to 90 wt %, more preferably 60 to 90 wt %, and yet more preferably 70 to 90 wt %.

(Polymerization Initiator)

The ink composition in the ink set of the present invention preferably comprises a polymerization initiator.

As a polymerization initiator that can be used in the present invention, a known polymerization initiator may be used.

The polymerization initiator that can be used in the present invention may be used singly or in a combination of two or more types. The ink composition may comprises a radical polymerization initiator and a cation polymerization initiator, and preferably comprises at least a radical polymerization initiator.

The polymerization initiator that can be used in the present invention is a compound that forms a polymerization initiating species by absorbing external energy. The external energy used for initiating polymerization can be broadly divided into heat and actinic radiation, a thermal polymerization initiator and a photopolymerization initiator are used respectively, and a photopolymerization initiator are preferably used. Examples of the actinic radiation include γ rays, β rays, an electron beam, ultraviolet rays, visible light, and infrared rays, and preferred examples include ultraviolet rays.

As a radical polymerization initiator that can be used in the present invention, a known radical polymerization initiator may be used.

Examples of the radical polymerization initiator that can be used in the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound. With regard to these radical polymerization initiators, the above-mentioned compounds (a) to (m) may be used singly or in combination.

Among them, (a) an aromatic ketone and (b) an acylphosphine compound are preferably used.

Preferred examples of the aromatic ketone (a) and the thio compound (e) include a compound having a benzophenone skeleton or a compound having a thioxanthone skeleton (thioxanthone compound) described in 'RADIATION CURING IN POLYMER SCIENCE AND TECHNOLOGY' J. P. FOUASSIER J. F. RABEK (1993), pp. 77 to 117. Preferred examples of the aromatic ketone (a), the acylphosphine compound (b) and the thio compound (e) include an α-thio-benzophenone compound described in JP-B-47-6416, a benzoin ether compound described in JP-B-47-3981, an α-substituted benzoin compound described in JP-B-47-22326, a benzoin derivative described in JP-B-47-23664, an aroyl-phosphonic acid ester described in JP-A-57-30704, a dialkoxybenzophenone described in JP-B-60-26483, benzoin ethers described in JP-B-60-26403 and JP-A-62-81345, α-aminobenzophenones described in JP-B-1-34242, U.S. Pat. No. 4,318,791, and EP No. 0284561, p-di(dimethylaminobenzoyl)benzene described in JP-A-2-211452, a thio-substituted aromatic ketone described in JP-A-61-194062, an acylphosphine sulfide described in JP-B-2-9597, an acyl-phosphine described in JP-B-2-9596, a thioxanthone described in JP-B-63-61950, and a coumarin described in JP-B-59-42864.

The ink contained in the ink set of the present invention preferably comprises an acylphosphine compound and an α-hydroxyacetophenone compound in combination as radical polymerization initiators, and more preferably further comprises a benzophenone compound.

(Surfactant)

In the ink set of the present invention, the yellow ink and the magenta ink preferably further comprise a polysiloxane-based surfactant in an amount of at least 0.1 mass % but no greater than 3 mass %. Due to the surfactant being used, it becomes possible to adjust the ink surface tension and impart, to an ink droplet fired onto a substrate used in printing, appropriate wettability and ease of overlapping of different inks.

When the ink set of the present invention is used for indoor prints, in particular when a corrugated cardboard (corrugated board) is used as a substrate, the surface of the corrugated cardboard has relatively poor smoothness (with asperities) and low surface tension. Because of this, in order to obtain a uniform cured film, the yellow ink and the magenta ink preferably further comprise a polysiloxane-based surfactant in an amount of at least 0.1 mass % but no greater than 3 mass %. It is particularly preferably at least 1 mass % but no greater than 2 mass %.

The ink set of the present invention is preferably used in applications for prints used mainly indoors, and is more preferably used for printing on a corrugated cardboard substrate (corrugated board).

When printing is carried out on a corrugated cardboard, as physical properties necessary for an ink film, flexibility (no cracking when bent) is required. From the viewpoint of preventing cracking when bending a substrate, it is preferable for it to comprise, from among the monofunctional monomers, at least one type of monomer selected from PEA and CTFA, the sum total thereof being at least 5 mass % but no greater than 30 mass % of the sum total of the difunctional monomer.

(Inactive Methyl Methacrylate Homopolymer and/or Copolymer)

The yellow ink and the magenta ink contained in the ink set of the present invention preferably comprise an inactive methyl methacrylate homopolymer and/or copolymer. Being 'inactive' means not having a reactive ethylenically unsaturated group, etc.

When an ink having another hue such as a cyan ink or a black ink is used in combination, it is preferable for these inks also to comprise an inactive homopolymer and/or copolymer. Due to the use of this polymer in combination, ink abrasion resistance can be improved, and an ink having excellent discharge stability can be obtained.

The inactive homopolymer and/or copolymer preferably has a weight-average molecular weight of 4,000 to 120,000, and more preferably 8,000 to 80,000.

Preferred examples of the homopolymer include a methyl methacrylate homopolymer (polymethyl methacrylate PMMA).

Preferred examples of the copolymer include Elvacite 2013: a methyl methacrylate/n-butyl methacrylate copolymer (mass ratio 36/64, Mw: 37,000, Lucite International).

The inactive polymer is preferably added at a total amount of 0.3 to 4.0 mass % relative to the total mass of the ink.

(Other Components)

The yellow ink and the magenta ink in the ink set of the present invention may comprise as necessary, in addition to the above-mentioned components, the other surfactant, a co-sensitizer, a UV absorber, an antioxidant, an antifading agent, a conductive salt, a solvent, a polymer compound, a basic compound, etc. They are described in JP-A-2009-221416 and may be used in the present invention as well.

Furthermore, from the viewpoint of storage properties and suppression of head clogging, the ink composition in the ink set of the present invention preferably comprises a polymerization inhibitor.

The polymerization inhibitor is preferably added at 200 to 20,000 ppm relative to the total amount of the ink composition of the present invention.

Examples of the polymerization inhibitor include a nitroso-based polymerization inhibitor, a hindered amine-based polymerization inhibitor, hydroquinone, benzoquinone, p-methoxyphenol, TEMPO, TEMPOL, and AI cupferron.

(Ink Physical Properties)

With regard to the yellow ink and/or the magenta ink contained in the ink set of the present invention, it is preferable that the viscosity or the surface tension thereof is adjusted to be in a range that is suitable for discharging using an inkjet head mounted on the printer that is to be used. When a piezo inkjet head, which is usually widely used, is assumed to be used, the viscosity is preferably 6 to 30 mPa·s (25° C.), and particularly preferably 15 to 25 mPa·s.

Furthermore, the viscosity at the discharge temperature (preferably 25° C. to 80° C., and more preferably 25° C. to 50° C.) is preferably 3 to 15 mPa·s, and more preferably 3 to 13 mPa·s. It is preferable to adjust the compositional ratio of the ink composition of the present invention as appropriate so that the viscosity is in the above range. It becomes possible by setting a high viscosity at room temperature to avoid penetration of the ink composition into a recording medium even when a porous recording medium (support) is used, thus enabling uncured monomer to be reduced. Moreover, it is preferable since ink spreading at the time of firing of ink composition droplets can be suppressed, and as a result image quality can be improved.

On the other hand, the surface tension at 25° C. is preferably 20 to 40 mN/m, and particularly preferably 28 to 38 mN/m. When recording is carried out on various recording media such as polyolefin, PET, coated paper, or non-coated paper, from the viewpoint of spreading and penetration, the surface tension is preferably at least 20 mN/m, and from the viewpoint of wettability it is preferably no greater than 40 mN/m.

(Container (Ink Pack) for Storing Ink)

With regard to the state in which the ink of the ink set of the present invention is stored, it is preferable to minimize contact with air during storage and place it in a light-shielded state. The purpose of maintaining a light-shielded state is to prevent gelling due to a photopolymerization reaction during storage.

As a container that can be preferably used, an aluminum vapor-deposited plastic pouch is particularly preferable. An inner wall (face that is in contact with ink) of the aluminum vapor-deposited plastic pouch preferably employs a material that has excellent solvent resistance, such as polypropylene (PP), polyethylene (PE), or polytetrafluoroethylene (PTFE).

Examples of commercially available ink packs include the BiLL PAK series (Sun A. Kaken) and the Flow Pack Series UV (Fujimori Kogyo Co., Ltd.). An aluminum vapor-deposited pouch may also be obtained from SJ-D5 Inc. or Showa Marutsutsu Company, Ltd.

That is, the ink pack of the present invention preferably involves storage in an aluminum vapor-deposited plastic pouch and a state in which there are no bubbles in the interior of the pouch. The presence or absence of bubbles in the interior may be confirmed by a test using a syringe. The state is preferably such that there are no bubbles visible when an ink is extracted using a syringe.

(Low Molecular Weight Pigment Dispersant)

In the case of dispersing PY 185 or PR 48:4, when preparing pigment particles, a low-molecular-weight pigment dispersant may be used as necessary in addition to a polymeric dispersant.

Examples of the low-molecular-weight pigment dispersant used in the present invention include activators and salts thereof such as a higher fatty acid salt, an alkyl sulfate, an alkyl ester sulfate, an alkyl sulfonate, a sulfosuccinate, a naphthalenesulfonate, an alkyl phosphate, a polyoxyalkylene alkyl ether phosphate, a polyoxyalkylene alkylphenyl ether, a polyoxyethylene polyoxypropylene glycol, a glycerol ester, a sorbitan ester, a polyoxyethylene fatty acid amide, and an amine oxide.

A method for dispersing a pigment is not particularly limited, and various methods known to a person skilled in the art may be employed. As one method, after carrying out preliminary dispersion using a mixer, final dispersion up to fine pigment particles is carried out by means of so-called medium dispersion (ball mill, sand mill, bead mill, circulating bead mill, etc.). Among them, a bead mill dispersing apparatus is preferable since the dispersibility is excellent.

Beads used when carrying out bead mill dispersion are preferably those having a volume average diameter of 0.01 to 3.0 mm, more preferably 0.05 to 1.5 mm, and yet more preferably 0.1 to 1.0 mm, thereby giving a pigment dispersion having excellent stability.

For the purpose of removing crude particle content from the pigment dispersion after dispersing the pigment, it is also preferable to use a filter.

(Inkjet Recording Method)

The inkjet recording method of the present invention comprises 1) a step of discharging the yellow ink and/or the magenta ink contained in the ink set of the present invention onto a substrate as a recording medium from an inkjet recording head, and 2) a step of curing the discharged ink by irradiation with actinic radiation.

In order to carry out full color printing, it is preferable to use a cyan ink in addition to the yellow ink and the magenta ink, it is more preferable to further use a black ink, and it is particularly preferable to further use a black ink and a white ink.

Due to the inkjet recording method of the present invention comprising both steps 1) and 2), an image of cured color inks including the yellow ink and the magenta ink is formed above a recording medium (substrate).

Furthermore, due to the inkjet recording method of the present invention, a printed material comprising the yellow ink and the magenta ink, which are cured above a substrate, is obtained.

The discharge step 1) of the inkjet recording method of the present invention may employ inkjet recording equipment, which is explained in detail below.

(Inkjet Recording Device)

The inkjet recording device used in the inkjet recording method of the present invention is not particularly limited, and any known inkjet recording device that can achieve an intended resolution may be used. That is, any known inkjet recording device, such as a commercial product, may be selected and used in order to discharge an ink composition onto the recording medium (support) in the discharge step 1) of the inkjet recording method of the present invention.

The inkjet recording device that can be used in the present invention is equipped with, for example, an ink supply system, a temperature sensor, and an actinic radiation source.

The ink supply system comprises, for example, a main tank containing the ink composition of the present invention, a supply pipe, an ink composition supply tank immediately before an inkjet head, a filter, and a piezo system inkjet head. The piezo system inkjet head may be driven so as to discharge a multisize dot of preferably 1 to 100 μL, and more preferably 8 to 30 pL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

As described above, since it is desirable for the yellow ink and the magenta ink (both inks together denote 'the ink composition' in the present invention) to be discharged at a constant temperature, the inkjet recording device is preferably equipped with a temperature stabilizer for stabilizing the temperature of the ink composition. Parts to be controlled to a constant temperature include all of the supply pipe system and the members from the ink tank (including an intermediate tank if it is provided) to the discharging face of the nozzle. A section from the ink supply tank to the inkjet head is thermally insulated and heated.

A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition of the present invention is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. A viscosity at 25° C. of the ink composition is preferably no greater than 50 mPa·s. When in the above-mentioned range, good discharge stability can be obtained. By using the above-mentioned method, high discharge stability can be achieved.

The radiation curing type ink composition for an inkjet recording such as the ink composition of the present invention generally has a viscosity that is higher than that of a water-based ink composition normally used for an inkjet recording, and variation in viscosity due to a change in temperature at the time of discharge is large. Viscosity variation in the ink composition has a large effect on changes in liquid droplet size and changes in liquid droplet discharge speed and, consequently, causes the image quality to be degraded. It is therefore preferably to maintain the ink composition discharge temperature as constant as possible. In the present invention, the control range for the temperature of ink composition is preferably ±5° C. of a set temperature, more preferably ±2° C. of the set temperature, and yet more preferably ±1° C. of the set temperature.

Subsequently, 2) a step of curing the discharged ink by irradiation with actinic radiation (actinic energy ray) which is described later are explained.

The ink composition discharged onto the recording medium cures upon exposure to actinic radiation. This is due to an initiating species such as a radical or an acid being generated by decomposition of the radical polymerization initiator contained in the ink composition of the present invention by irradiation with actinic radiation, the initiating species functioning so as to make a polymerization reaction of a polymerizable compound take place and to promote it. In this process, if a sensitizer is present together with the polymerization initiator in the ink composition, the sensitizer in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizing dye, the peak wavelength of the actinic radiation is preferably, for example, 200 to 600 nm, more preferably 300 to 450 nm, yet more preferably 320 to 420 nm, and particularly preferably UV rays having a peak wave length of 340 to 400 nm.

Moreover, the ink composition of the present invention has sufficient sensitivity even for low output actinic radiation. It is therefore desirable to cure it with an exposure area illumination intensity of preferably 10 to 4,000 mW/cm$^2$, and more preferably 20 to 2,500 mW/cm$^2$.

As an actinic radiation source, a mercury lamp, a gas/solid laser, etc. are mainly used, and for UV photocuring inkjet ink composition a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, the example of the LED includes a LED, disclosed in U.S. Pat. No. 6,084,250, that can emit actinic radiation whose wavelength is centered between 300 nm and 370 nm. Furthermore, another violet LED is available, and irradiation can be carried out with radiation of a different UV bandwidth. The actinic radiation source preferable in the present invention is a UV-LED, and a UV-LED having a peak wavelength at 340 to 400 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mW/cm$^2$.

The ink composition of the present invention is desirably exposed to such actinic radiation preferably for 0.01 to 120 sec, and more preferably 0.1 to 90 sec.

Irradiation conditions for the actinic radiation and basic irradiation methods are disclosed in JP-A-60-132767. Specifically, light sources are provided on opposite sides of a head unit comprising an ink composition discharge system, and the head unit and the light sources are made to scan by a so-called shuttle system. Irradiation with actinic radiation is carried out after a fixed period of time (preferably 0.01 to 0.5 sec, more preferably 0.01 to 0.3 sec, and particularly preferably 0.01 to 0.15 sec) has elapsed after the ink composition has landed. By controlling the time from after the ink composition has landed until before the irradiation so that it is a very short time, it is possible to prevent the ink composition that has landed on a recording medium from spreading before being cured. Furthermore, when a porous recording medium is used, since exposure can be carried out before the ink composition penetrates to a deep part where the light source cannot reach, it is possible to suppress residual unreacted monomer, which is preferable.

Moreover, curing may be completed by another light source that is not driven. International patent application WO 99/54415 discloses as an irradiation method a method employing optical fiber or a method in which a collimated light source is shone on a mirror surface provided on a side face of a head unit and a recording area is irradiated with UV rays, and such a curing method can also be applied to the inkjet recording method of the present invention.

By employing the above-mentioned inkjet recording method, it is possible to keep the diameter of landed ink composition dots constant even for various recording media having different surface wettabilities, thus improving the image quality. When obtaining a colored image, by superimposing in order from high lightness inks, it becomes easy for radiation to reach ink in a lower part, and good curing sensitivity, reduction of residual monomer, and improvement in adhesion can be expected. Although it is possible to carry out irradiation all at once after all colors are discharged, it is preferable in terms of promoting curing that exposure to light is carried out for each color.

In this way, the ink composition of the present invention cures with high sensitivity upon exposure to actinic radiation, thereby forming an image on the surface of a recording medium.

The ink set of the present invention is preferably used as an ink set further comprising a cyan ink, a black ink, and a white ink.

The order in which colored ink discharged is not particularly limited, but it is preferable to apply to a recording medium from a colored ink composition having a high lightness; when the ink compositions of yellow, cyan, magenta, and black are used, they are preferably applied on top of the recording medium in the order yellow→cyan→magenta→black. Furthermore, when white is additionally used, they are preferably applied on top of the recording medium in the order white→yellow→cyan→magenta→black. Moreover, the present invention is not limited thereto, and an ink set comprising a total of seven colors, that is, light cyan, light magenta ink compositions and cyan, magenta, black, white, and yellow dark ink compositions may preferably be used, and in this case they are applied on top of the recording medium in the order white→light cyan→light magenta→yellow→cyan→magenta→black.

In the present invention, the recording medium is not particularly limited, and known recording medium known as a support or a recording material may be used. Examples thereof include a corrugated cardboard, paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a corrugated cardboard may suitably be used.

'Corrugated cardboard' means a paper sheet product formed by strengthening paper board by means of a multi-layer structure and processing it for use as a packaging material, etc. It includes, in addition to a corrugated cardboard sheet as a material, a reprocessed corrugated cardboard box, and other corrugated cardboard products. The corrugated cardboard may be a corrugated cardboard with a kraft color, which is the color of a usual starting paper, but a white corrugated cardboard with a white appearance using a white liner is preferable since a finished print is attractive. In the case of a corrugated cardboard with a kraft color, color printing may be carried out after solid printing with a white ink is carried out as necessary In accordance with the present invention, there can be provided a radiation-curable inkjet ink set that has excellent saturation and a wide color gamut and that gives excellent mechanical strength and substrate adhesion, and an inkjet recording method.

EXAMPLES

The present invention is explained in detail below based on Examples, but the present invention is not limited to these Examples.

(Yellow Pigment Dispersions)

The yellow pigment dispersions described below were produced and used in the production of yellow inks.

In the formulations below 'parts' and '%' denote 'parts by mass' and 'mass %' respectively unless otherwise specified.

Of the formulations described in Table 3 below, a total of 80 parts of components other than the pigment (dispersant, monomer and polymerization inhibitor) was stirred in a mixer manufactured by SILVERSON (10 to 15 minutes, 2,000 to 3,000 rpm), thus giving a dispersant dilution as a uniform transparent liquid. The yellow pigment was added to this dispersant dilution, and further stirring was carried out using a mixer (10 to 20 minutes, 2,000 to 3,000 rpm), thus giving a uniform pigment preliminary dispersion. Subsequently, dispersion was carried out using a circulating bead mill (Laboratory Mini Mill) manufactured by EIGER. Dispersion conditions were such that 100 parts of zirconia beads having a diameter of 0.65 mm was charged, the peripheral speed was 15 m/s, and the dispersion time was 60 to 120 minutes. Yellow pigment dispersions YM1 to YM4 were obtained.

TABLE 3

|  |  | YM1 | YM2 | YM3 | YM4 |
|---|---|---|---|---|---|
| Pigment | Paliotol Yellow D1155 (PY 185) | 20 | — | — | — |
|  | Irgazin Yellow 2088 (PY 151) | — | 20 | — | — |
|  | INKJET YELLOW H2G (PY 120) | — | — | 20 | — |
|  | Cromophtal Yellow LA (PY 150) | — | — | — | 20 |
| Dispersant | EFKA 7701 | 10 | 10 | 10 | — |
|  | Sol 32000 | — | — | — | 10 |
| Monomer | PEA | 69.9 | 69.9 | 69.9 | 69.9 |
| Inhibitor | UV12 | 0.1 | 0.1 | 0.1 | 0.1 |

The pigments and dispersants used for the preparation of yellow pigment dispersions YM1 to YM4 were as follows.

Paliotol Yellow D1155: yellow pigment; C.I. Pigment Yellow 185 (BASF)

Irgazin Yellow 2088 (PY 151): yellow pigment; C.I. Pigment Yellow 151 (BASF)
INKJET YELLOW H2G (PY 120): yellow pigment; C.I. Pigment Yellow 120 (Clariant)
Cromophtal Yellow LA (PY 150): yellow pigment; C.I. Pigment Yellow 150 (BASF)
EFKA 7701: polymeric dispersant (BASF)
Sol 32000: polymeric dispersant (Lubrizol)
PEA: SR339C, phenoxyethyl acrylate (Sartomer)
UV12: FLORSTAB UV12, polymerization inhibitor (Kromachem)

(Magenta Pigment Dispersions)

The magenta pigment dispersions described below were produced and used in the production of magenta inks.

Of the formulations described in Table 4 below, a total of 80 parts of components other than the pigment (dispersant, monomer and polymerization inhibitor) was stirred in a mixer manufactured by SILVERSON (10 to 15 minutes, 2,000 to 3,000 rpm), thus giving a dispersant dilution as a uniform transparent liquid. The pigment was added to this dispersant dilution, and further stirring was carried out using a mixer (10 to 20 minutes, 2,000 to 3,000 rpm), thus giving a uniform pigment preliminary dispersion. Subsequently, dispersion was carried out using a circulating bead mill (Laboratory Mini Mill) manufactured by EIGER. Dispersion conditions were such that 100 parts of zirconia beads having a diameter of 0.65 mm was charged, the peripheral speed was 15 m/s, and the dispersion time was 60 to 120 minutes. Magenta pigment dispersions MM1 to MM3 were obtained.

TABLE 4

|  |  | MM1 | MM2 | MM3 |
|---|---|---|---|---|
| Pigment | Irgalite Red FBL (PR 48:4) | 20 | — | — |
|  | Cromophtal Pink PT (PR 122) | — | 20 | — |
|  | Hostaperm INKJET E5B02 (PV 19) | — | — | 20 |
| Dispersant | EFKA 7731 | 10 | 10 | 10 |
| Monomer | PEA | 69.9 | 69.9 | 69.9 |
| Inhibitor | UV12 | 0.1 | 0.1 | 0.1 |

The pigments and dispersants used for the preparation of magenta pigment dispersions MM1 to MM3 were as follows.
Irgalite Red FBL: magenta pigment; C.I. Pigment Red 48:4 (BASF)
Cromophtal Pink PT: magenta pigment; C.I. Pigment Red 122 (BASF)
Hostaperm INKJET E5B02: magenta pigment; C.I. Pigment Violet 19 (Clariant)

(Cyan Pigment Dispersion and Black Pigment Dispersion)

Of the formulations described in Table 5 below, a total of 80 parts of components other than the pigment (dispersant, monomer and polymerization inhibitor) was stirred in a mixer manufactured by SILVERSON (10 to 15 minutes, 2,000 to 3,000 rpm), thus giving a dispersant dilution as a uniform transparent liquid. The pigment was added to this dispersant dilution, and further stirring was carried out using a mixer (10 to 20 minutes, 2,000 to 3,000 rpm), thus giving a uniform pigment preliminary dispersion. Subsequently, dispersion was carried out using a circulating bead mill (Laboratory Mini Mill) manufactured by EIGER. Dispersion conditions were such that 100 parts of zirconia beads having a diameter of 0.65 mm was charged, the peripheral speed was 15 m/s, and the dispersion time was 30 to 60 minutes. Cyan pigment dispersion CM1 and black pigment dispersion KM1 were obtained.

TABLE 5

|  |  | CM1 | KM1 |
|---|---|---|---|
| Pigment | IRGALITE BLUE GLVO (PB15:4) | 30 | — |
|  | MOGUL E (CB) | — | 40 |
| Dispersant | Sol 32000 | 10 | — |
|  | EFKA 7731 | — | 10 |
| Monomer | PEA | 59.9 | 59.9 |
| Inhibitor | UV12 | 0.1 | 0.1 |

The pigments below were used in cyan pigment dispersion CM1 and black pigment dispersion KM1.
IRGALITE BLUE GLVO: cyan pigment; C.I. Pigment Blue 15:4 (BASF)
MOGUL E: black pigment; C.I. Pigment Black 7 (Cabot)

(Yellow Ink)

Of the formulations described in Table 6, the components other than the pigment were stirred in a mixer manufactured by SILVERSON (10 to 15 minutes, 2,000 to 3,000 rpm), thus giving a uniform transparent liquid. The yellow pigment dispersion produced above was added to this transparent liquid and stirring was carried out (10 to 20 minutes, 2,000 to 3,000 rpm), thus giving yellow inks Y1 to Y4. The inks thus prepared were filtered using a 1.5 μm filter (PROFILE STAR PALL).

(Monomers)

Monomers other than those described above were as follows.
DPGDA: SR508, dipropylene glycol diacrylate (Sartomer)
TPGDA: SR306, tripropylene glycol diacrylate (Sartomer)
CTFA: SR531, cyclic trimethylolpropaneformal acrylate (Sartomer)

(Radical Polymerization Initiators)

The radical polymerization initiators used were as follows.
Irgacure 184 (polymerization initiator (1-hydroxycyclohexyl phenyl ketone), BASF Japan)
Darocur TPO (TPO (2,4,6-trimethylbenzoyldiphenylphosphine oxide), polymerization initiator, BASF Japan)
Benzophenone (polymerization initiator, Wako Pure Chemical Industries, Ltd.)

(Resins)
Elvacite 2013 (methyl methacrylate/n-butyl methacrylate copolymer (ratio by mass 36/64, Mw: 37,000, Lucite International)
PARALOID™ DM-55 (methyl methacrylate copolymer, Dow)

(Surfactant)
Byk 307: polydimethylsiloxane-based surfactant (BYK-Chemie)

TABLE 6

|  |  | Ink | | | |
|---|---|---|---|---|---|
|  |  | Y1 | Y2 | Y3 | Y4 |
| Monomer | DPGDA | 53 | 43 | 43 | 53 |
|  | TPGDA | 10 | 10 | 10 | 10 |
|  | PEA | 4.5 | 4.5 | 4.5 | 4.5 |
|  | CTFA | 4.5 | 4.5 | 4.5 | 4.5 |
| Resin | Elvacite 2013 | 1.4 | 1.4 | 1.4 | 1.4 |
|  | PARALOID™ DM-55 | 2.0 | 2.0 | 2.0 | 2.0 |
| Initiator | Irgacure 184 | 3.7 | 3.7 | 3.7 | 3.7 |
|  | TPO | 7.8 | 7.8 | 7.8 | 7.8 |
|  | Benzophenone | 3.7 | 3.7 | 3.7 | 3.7 |
| Inhibitor | UV12 | 0.3 | 0.3 | 0.3 | 0.3 |
| Surfactant | Byk 307 | 0.1 | 0.1 | 0.1 | 0.1 |

TABLE 6-continued

|  |  | Ink |  |  |  |
|---|---|---|---|---|---|
|  |  | Y1 | Y2 | Y3 | Y4 |
| Pigment dispersion | PY 185 dispersion YM1 | 9 | — | — | — |
|  | PY 151 dispersion YM2 | — | 19 | — | — |
|  | PY 120 dispersion YM3 | — | — | 19 | — |
|  | PY 150 dispersion YM4 | — | — | — | 9 |

(Magenta Ink)

Of the formulations described in Table 7, the components other than the pigment were stirred in a mixer manufactured by SILVERSON (10 to 15 minutes, 2,000 to 3,000 rpm), thus giving a uniform transparent liquid. The magenta pigment dispersion produced above was added to this transparent liquid and stirring was carried out (10 to 20 minutes, 2,000 to 3,000 rpm), thus giving magenta inks M1 to M3. The inks thus prepared were filtered using a 1.5 μm filter (PROFILE STAR PALL).

TABLE 7

|  |  | Ink |  |  |
|---|---|---|---|---|
|  |  | M1 | M2 | M3 |
| Monomer | DPGDA | 52 | 42 | 47 |
|  | TPGDA | 10 | 10 | 10 |
|  | PEA | 4.5 | 4.5 | 4.5 |
|  | CTFA | 4.5 | 4.5 | 4.5 |
| Resin | Elvacite 2013 | 1.4 | 1.4 | 1.4 |
|  | PARALOID ™ DM-55 | 2.0 | 2.0 | 2.0 |
| Initiator | Irgacure 184 | 3.7 | 3.7 | 3.7 |
|  | TPO | 7.8 | 7.8 | 7.8 |
|  | Benzophenone | 3.7 | 3.7 | 3.7 |
| Inhibitor | UV12 | 0.3 | 0.3 | 0.3 |
| Surfactant | Byk 307 | 0.1 | 0.1 | 0.1 |
| Pigment dispersion | PR 48:4 dispersion MM1 | 10 | — | — |
|  | PR 122 dispersion MM2 | — | 20 | — |
|  | PV 19 dispersion MM3 | — | — | 15 |

(Cyan Ink and Black Ink)

Of the formulations described in Table 8, the components other than the pigment were stirred in a mixer manufactured by SILVERSON (10 to 15 minutes, 2,000 to 3,000 rpm), thus giving a uniform transparent liquid. The dispersions CM1 and KM1 produced above were added to this transparent liquid and stirring was carried out (10 to 20 minutes, 2,000 to 3,000 rpm), thus giving cyan ink C1 and black ink K1. The inks thus prepared were filtered using a 1.5 μm filter (PROFILE STAR PALL).

TABLE 8

|  |  | Ink |  |
|---|---|---|---|
|  |  | C1 | K1 |
| Monomer | DPGDA | 54 | 53 |
|  | TPGDA | 10 | 10 |
|  | PEA | 4.5 | 4.5 |
|  | CTFA | 4.5 | 4.5 |
| Resin | Elvacite 2013 | 1.4 | 1.4 |
|  | PARALOID ™ DM-55 | 2.0 | 2.0 |
| Initiator | Irgacure 184 | 3.7 | 3.7 |
|  | TPO | 7.8 | 7.8 |
|  | Benzophenone | 3.7 | 3.7 |
| Inhibitor | UV12 | 0.3 | 0.3 |
| Surfactant | Byk 307 | 0.1 | 0.1 |
| Pigment dispersion | PB 15:4 dispersion CM1 | 8 | — |
|  | CB dispersion KM1 | — | 9 |

Example 1 and Comparative Examples 1 to 5

The yellow inks and the magenta inks produced as above were used as ink sets. Cyan ink C1 and black ink K1 were also used in common in combination therewith. A commercially available inkjet printer (LuxelJet UV350GTW, Fujifilm Corporation) was charged with a combination shown in Table 9 below, and a sample print was produced using this ink set. The sample print employed yellow 100%, magenta 100%, cyan 100%, black 100%, red 100%, blue 100%, and green 100%. As a substrate a white corrugated cardboard was used.

100% refers to the conditions for the maximum amount of ink obtained when printing is carried out in accordance with printing conditions for the KI ink series (KI867, KI215, KI052, Fujifilm Speciality Ink Systems), which are standard inks for the printer.

TABLE 9

|  | Ink set |  |  |  |
|---|---|---|---|---|
|  | Yellow |  | Magenta |  |
| Ex. 1 | Y1 | PY 185 | M1 | PR 48:4 |
| Comp. Ex. 1 |  |  | M2 | PV 19 |
| Comp. Ex. 2 |  |  | M3 | PR 122 |
| Comp. Ex. 3 | Y2 | PY 151 | M1 | PR 48:4 |
| Comp. Ex. 4 | Y3 | PY 120 |  |  |
| Comp. Ex. 5 | Y4 | PY 150 |  |  |

(Note)
Cyan ink used was C1, black ink used was K1.

Reflection density and saturation (C) of sample prints produced as above were measured using a colorimeter (SpectroEye, Xrite). The results thus obtained are shown in Table 10. The ink set of Example 1 showed excellent reflection density and saturation for yellow, magenta, and red hues compared with the ink sets of the Comparative Examples. With regard to the reflection density and the saturation, the evaluation was categorized into 'excellent', 'pass', and 'poor' in accordance with the criteria shown in Table 11 below. Here, 'excellent' and 'pass' are in a preferred range in practice.

TABLE 10

|  | Ink set |  | Yellow 100% |  | Magenta 100% |  | Red 100% |  |
|---|---|---|---|---|---|---|---|---|
|  | Yellow | Magenta | Reflection density | Saturation | Reflection density | Saturation | Reflection density | Saturation |
| Ex. 1 | Y1 PY 185 | M1 PR 48:4 | 1.9 | 106 | 2.2 | 83 | 2.3 | 107 |

TABLE 10-continued

|  | Ink set | | Yellow 100% | | Magenta 100% | | Red 100% | |
|---|---|---|---|---|---|---|---|---|
|  | Yellow | Magenta | Reflection density | Saturation | Reflection density | Saturation | Reflection density | Saturation |
| Comp. Ex. 1 |  | M2 PV 19 |  |  | 2.0 | 80 | 2.2 | 106 |
| Comp. Ex. 2 |  | M3 PR 122 |  |  | 1.9 | 78 | 2.1 | 105 |
| Comp. Ex. 3 | Y2 PY 151 | M1 PR 48:4 | 1.7 | 96 | 2.2 | 83 | 2.0 | 101 |
| Comp. Ex. 4 | Y3 PY 120 |  | 1.7 | 96 |  |  | 2.0 | 101 |
| Comp. Ex. 5 | Y4 PY 150 |  | 2.0 | 95 |  |  | 2.4 | 101 |

TABLE 11

| Yellow 100% | | | | Magenta 100% | | | | Red 100% | | | |
|---|---|---|---|---|---|---|---|---|---|---|---|
| Reflection density | | Saturation | | Reflection density | | Saturation | | Reflection density | | Saturation | |
| Exc. | ≥1.9 | Exc. | ≥105 | Exc. | ≥2.2 | Exc. | ≥83 | Exc. | ≥2.2 | Exc. | ≥107 |
| Pass | ≥1.8 | Pass | ≥100 | Pass | ≥2.1 | Pass | ≥80 | Pass | ≥2.1 | Pass | ≥105 |
| Poor | <1.8 | Poor | <100 | Poor | <2.1 | Poor | <80 | Poor | <2.1 | Poor | <105 |

(Evaluation of Film Physical Properties of Cured Ink Film)

The red section of the sample print produced as above was subjected to evaluation in terms of film physical properties (fingernail scratch, cross-cut) in accordance with the criteria below. With regard to fingernail scratch and cross-cut, scores of 5 and 4 points are within a practical range.

The evaluation results for the film physical properties of fingernail scratch and cross-cut are shown in Table 12. The sample of Example 1 showed excellent reflection density and saturation as well as good film physical properties.

(Fingernail Scratch)

One and the same position of an image obtained was scratched with a fingernail twice, and peel-off of the sample print was evaluated using the criteria below.

5 points: no print peel-off by scratching twice 3 points: no peel-off by scratching once but peeled off by 2nd scratching 1 point: peeled off by 1st scratching (Cross-Cut)

5 points: 0 or 1 in accordance with DIN EN ISO 2409 (excellent)

4 points: 2 in accordance with DIN EN ISO 2409 (good)

3 points: 3 in accordance with DIN EN ISO 2409 (poor)

2 points: 4 in accordance with DIN EN ISO 2409 (very poor)

1 point: 5 in accordance with DIN EN ISO 2409 (no adhesion at all)

TABLE 12

|  | Ink set | | Film properties evaluation item Red 100% | |
|---|---|---|---|---|
|  | Yellow | Magenta | Fingernail scratch | Cross-cut |
| Ex. 1 | Y1 PY 185 | M1 PR 48:4 | 5 | 5 |
| Comp. Ex. 1 |  | M2 PV 19 | 3 | 3 |
| Comp. Ex. 2 |  | M3 PR 122 | 3 | 2 |
| Comp. Ex. 3 | Y2 PY 151 |  | 3 | 2 |
| Comp. Ex. 4 | Y3 PY 120 | M1 PR 48:4 | 3 | 2 |
| Comp. Ex. 5 | Y4 PY 150 |  | 5 | 5 |

(Yellow Pigment Dispersions and Types of Polymeric Dispersants)

Of the formulations described in Table 13 below, a total of 80 parts of components other than the pigment was stirred in a mixer manufactured by SILVERSON (10 to 15 minutes, 2,000 to 3,000 rpm), thus giving a dispersant dilution as a uniform transparent liquid. The yellow pigment was added to this dispersant dilution, and further stirring was carried out using a mixer (10 to 20 minutes, 2,000 to 3,000 rpm), thus giving a uniform preliminary dispersion. Subsequently, dispersion was carried out using a circulating bead mill (Laboratory Mini Mill) manufactured by EIGER. Dispersion conditions were such that 100 parts of zirconia beads having a diameter of 0.65 mm was charged, the peripheral speed was 15 m/s, and the dispersion time was 60 to 120 minutes. Yellow pigment dispersions YM1 and YM5 to YM12 were obtained.

(Dispersant)

PB-821 (Ajinomoto-Fine-Techno Co., Inc.)

TABLE 13

|  |  | YM1 | YM5 | YM6 | YM7 | YM8 | YM9 | YM10 | YM11 | YM12 |
|---|---|---|---|---|---|---|---|---|---|---|
| Pigment | Paliotol Yellow D1155 (PY 185) | 20 | 20 | 20 | 20 | 20 | 20 | 20 | 20 | 20 |
| Dispersant | EFKA 7701 | 8 | — | — | — | — | — | — | — | — |
|  | Synthetic dispersant (1) | — | 8 | — | — | — | — | — | — | — |

TABLE 13-continued

|  |  | YM1 | YM5 | YM6 | YM7 | YM8 | YM9 | YM10 | YM11 | YM12 |
|---|---|---|---|---|---|---|---|---|---|---|
|  | Synthetic dispersant (2) | — | — | 8 | — | — | — | — | — | — |
|  | Synthetic dispersant (3) | — | — | — | 8 | — | — | — | — | — |
|  | TEGO Disper 685 | — | — | — | — | 8 | — | — | — | — |
|  | BYK168 | — | — | — | — | — | 25 | — | — | — |
|  | EFKA 7731 | — | — | — | — | — | — | 8 | — | — |
|  | Sol 32000 | — | — | — | — | — | — | — | 8 | — |
|  | PB-821 | — | — | — | — | — | — | — | — | 8 |
| Monomer | PEA | 71.9 | 71.9 | 71.9 | 71.9 | 71.9 | 54.9 | 71.9 | 71.9 | 71.9 |
| Inhibitor | UV12 | 0.1 | 0.1 | 0.1 | 0.1 | 0.1 | 0.1 | 0.1 | 0.1 | 0.1 |

(Magenta Pigment Dispersions and Types of Polymeric Dispersants)

Of the formulations described in Table 14 below, a total of 80 parts of components other than the pigment was stirred in a mixer manufactured by SILVERSON (10 to 15 minutes, 2,000 to 3,000 rpm), thus giving a dispersant dilution as a uniform transparent liquid. The magenta pigment was added to this dispersant dilution, and further stirring was carried out using a mixer (10 to 20 minutes, 2,000 to 3,000 rpm), thus giving a uniform preliminary dispersion. Subsequently, dispersion was carried out using a circulating bead mill (Laboratory Mini Mill) manufactured by EIGER. Dispersion conditions were such that 100 parts of zirconia beads having a diameter of 0.65 mm was charged, the peripheral speed was 15 m/s, and the dispersion time was 60 to 120 minutes. Magenta pigment dispersions MM1 and MM4 to MM10 were obtained. The properties of the dispersants used are shown in Table 15.

With regard to the glass transition temperature, '<25° C.' means no greater than 25° C., and '>25° C.' means a temperature exceeding 25° C.

TABLE 14

|  |  | MM1 | MM4 | MM5 | MM6 | MM7 | MM8 | MM9 | MM10 |
|---|---|---|---|---|---|---|---|---|---|
| Pigment | Irgalite Red FBL (PR 48:4) | 20 | 20 | 20 | 20 | 20 | 20 | 20 | 20 |
| Dispersant | Synthetic dispersant (1) | 10 | — | — | — | — | — | — | — |
|  | Synthetic dispersant (2) | — | 10 | — | — | — | — | — | — |
|  | Synthetic dispersant (3) | — | — | 10 | — | — | — | — | — |
|  | TEGO Dispers 685 | — | — | — | 10 | — | — | — | — |
|  | BYK168 | — | — | — | — | 33 | — | — | — |
|  | EFKA 7731 | — | — | — | — | — | 10 | — | — |
|  | Sol 32000 | — | — | — | — | — | — | 10 | — |
|  | PB-821 | — | — | — | — | — | — | — | 10 |
| Monomer | PEA | 69.9 | 69.9 | 69.9 | 69.9 | 46.9 | 69.9 | 69.9 | 69.9 |
| Inhibitor | UV12 | 0.1 | 0.1 | 0.1 | 0.1 | 0.1 | 0.1 | 0.1 | 0.1 |

TABLE 15

| Dispersant name | Amine value | Molecular weight | Structure | Tg |
|---|---|---|---|---|
| EFKA 7701 | 40.0 mg KOH/g | 22,000 | Block | <25° C. |
| Synthetic dispersant (1) | 42.0 mg KOH/g | 40,000 | Graft | >25° C. |
| Synthetic dispersant (2) | 42.0 mg KOH/g | 10,000 | Graft | >25° C. |
| Synthetic dispersant (3) | 42.2 mg KOH/g | 50,000 | Graft | >25° C. |

TABLE 15-continued

| Dispersant name | Amine value | Molecular weight | Structure | Tg |
|---|---|---|---|---|
| TEGO Dispers 685 | 37.4 mg KOH/g | 68,000 | Graft | <25° C. |
| BYK168 | 33.2 mg KOH/g | 40,000 | — | >25° C. |
| EFKA 7731 | 25.1 mg KOH/g | — | Random | <25° C. |
| Sol 32000 | 10.3 mg KOH/g | 45,000 | Graft | <25° C. |
| PB-821 | 10.3 mg KOH/g | 50,000 | — | <25° C. |

Ease of handling was compared between the pigment dispersions produced (Tables 13 and 14). After production, 30 g thereof was placed in a 30 mL plastic bottle and stored at room temperature (15° C. to 30° C.) for 2 weeks. After 2 weeks, the time taken when tilting the plastic bottle through 135 degrees gently without stirring, and transferring the pigment dispersion to another plastic bottle was measured. Specifically, the other plastic bottle was placed on an electronic balance, and the time taken for it to reach 25 g was measured. The results thus obtained are shown in Table 16 below.

A pigment dispersion that could be transferred within 15 seconds can be said to have particularly good storage stability.

For PY 185, when a dispersant having an amine value of 40 to 42 mg KOH/g and a molecular weight of about 20,000 to 40,000 was used, a dispersion having particularly good stability was obtained. On the other hand, for PR 48:4, when a dispersant having an amine value of 32 to 43 mg KOH/g and a molecular weight of about 40,000 to 70,000 was used, a dispersion having particularly good stability was obtained.

TABLE 16

|  | Dispersant used | Pigment type | Measurement time |
|---|---|---|---|
| YM1 | EFKA 7701 | Paliotol Yellow D1155 (PY 185) | Within 15 sec |
| YM5 | Synthetic dispersant (1) | Paliotol Yellow D1155 (PY 185) | 30 sec to 45 sec |
| YM6 | Synthetic dispersant (2) | Paliotol Yellow D1155 (PY 185) | ≥3 minutes |
| YM7 | Synthetic dispersant (3) | Paliotol Yellow D1155 (PY 185) | ≥3 minutes |
| YM8 | TEGO Disper 685 | Paliotol Yellow D1155 (PY 185) | ≥3 minutes |
| YM9 | BYK168 | Paliotol Yellow D1155 (PY 185) | ≥3 minutes |
| YM10 | EFKA 7731 | Paliotol Yellow D1155 (PY 185) | ≥3 minutes |
| YM11 | Sol 32000 | Paliotol Yellow D1155 (PY 185) | ≥3 minutes |
| YM12 | PB-821 | Paliotol Yellow D1155 (PY 185) | ≥3 minutes |
| MM1 | Synthetic dispersant (1) | Irgalite Red FBL (PR 48:4) | Within 15 sec |
| MM4 | Synthetic dispersant (2) | Irgalite Red FBL (PR 48:4) | ≥3 minutes |
| MM5 | Synthetic dispersant (3) | Irgalite Red FBL (PR 48:4) | Within 15 sec |
| MM6 | TEGO Disper 685 | Irgalite Red FBL (PR 48:4) | Within 15 sec |
| MM7 | BYK168 | Irgalite Red FBL (PR 48:4) | Within 15 sec |
| MM8 | EFKA 7731 | Irgalite Red FBL (PR 48:4) | 120 sec to 150 sec |
| MM9 | Sol 32000 | Irgalite Red FBL (PR 48:4) | ≥3 minutes |
| MM10 | PB-821 | Irgalite Red FBL (PR 48:4) | ≥3 minutes |

(Yellow Inks and Types of Polymeric Dispersants)

Of the formulations described in Table 17 below, the components other than the pigment were stirred in a mixer manufactured by SILVERSON (10 to 15 minutes, 2,000 to 3,000 rpm), thus giving a composition as a uniform transparent liquid. The pigment dispersion produced above was added to this transparent liquid and stirring was carried out (10 to 20 minutes, 2,000 to 3,000 rpm), thus giving a yellow ink. The ink thus prepared was filtered using a 1.5 μm filter (PROFILE STAR PALL).

TABLE 17

| | | Y1 | Y5 | Y6 | Y7 |
|---|---|---|---|---|---|
| Monomer | DPGDA | 53 | 53 | 53 | 53 |
| | TPGDA | 10 | 10 | 10 | 10 |
| | PEA | 4.5 | 4.5 | 4.5 | 4.5 |
| | CTFA | 4.5 | 4.5 | 4.5 | 4.5 |
| Resin | Elvacite 2013 | 1.4 | 1.4 | 1.4 | 1.4 |
| | PARALOID™ DM-55 | 2.0 | 2.0 | 2.0 | 2.0 |
| Initiator | Irgacure 184 | 3.7 | 3.7 | 3.7 | 3.7 |
| | TPO | 7.8 | 7.8 | 7.8 | 7.8 |
| | Benzophenone | 3.7 | 3.7 | 3.7 | 3.7 |
| Inhibitor | UV12 | 0.3 | 0.3 | 0.3 | 0.3 |
| Surfactant | Byk 307 | 0.1 | 0.1 | 0.1 | 0.1 |
| Pigment dispersion | PY 185 dispersion YM1 EFKA 7701 | 9 | — | — | — |
| | PY 185 dispersion YM5 Synthetic dispersant (1) | — | 9 | — | — |
| | PY 185 dispersion YM8 TEGO Disper 685 | — | — | 9 | — |
| | PY 185 dispersion YM9 BYK168 | — | — | — | 9 |

(Magenta Inks and Polymeric Dispersants)

Of the formulations described in Table 18 below, the components other than the pigment were stirred in a mixer manufactured by SILVERSON (10 to 15 minutes, 2,000 to 3,000 rpm), thus giving a uniform transparent liquid. The pigment dispersion produced above was added to this transparent liquid and stirring was carried out (10 to 20 minutes, 2,000 to 3,000 rpm), thus giving an ink. The ink thus prepared was filtered using a 1.5 μm filter (PROFILE STAR PALL).

TABLE 18

| | | M1 | M6 | M7 | M8 |
|---|---|---|---|---|---|
| Monomer | DPGDA | 52 | 52 | 52 | 52 |
| | TPGDA | 10 | 10 | 10 | 10 |
| | PEA | 4.5 | 4.5 | 4.5 | 4.5 |
| | CTFA | 4.5 | 4.5 | 4.5 | 4.5 |
| Resin | Elvacite 2013 | 1.4 | 1.4 | 1.4 | 1.4 |
| | PARALOID™ DM-55 | 2.0 | 2.0 | 2.0 | 2.0 |
| Initiator | Irgacure 184 | 3.7 | 3.7 | 3.7 | 3.7 |
| | TPO | 7.8 | 7.8 | 7.8 | 7.8 |
| | Benzophenone | 3.7 | 3.7 | 3.7 | 3.7 |
| Inhibitor | UV12 | 0.3 | 0.3 | 0.3 | 0.3 |
| Surfactant | Byk 307 | 0.1 | 0.1 | 0.1 | 0.1 |
| Pigment dispersion | PR 48:4 dispersion MM1 Synthetic dispersant (1) | 10 | — | — | — |
| | PR 48:4 dispersion MM6 TEGO Disper 685 | — | 10 | — | — |
| | PR 48:4 dispersion MM7 BYK168 | — | — | 10 | — |
| | PR 48:4 dispersion MM8 EFKA 7731 | — | — | — | 10 |

Examples 2 to 5

A commercially available inkjet printer (LuxelJet UV350GTW, Fujifilm Corporation) was charged with the inks produced as above in the combinations shown in Table 19 below, and sample prints were produced using them. The prints employed yellow 100%, magenta 100%, cyan 100%, black 100%, red 100%, blue 100%, and green 100%. The substrate was a white corrugated cardboard.

100% refers to the conditions for the maximum amount of ink obtained when printing is carried out in accordance with printing conditions for the KI ink series (KI867, KI215, KI052, Fujifilm Speciality Ink Systems), which are standard inks for the printer.

TABLE 19

| Ink set | | | | | Dispersant Tg |
|---|---|---|---|---|---|
| Yellow | | | Magenta | | |
| Ex. 2 | Y1 PY 185 | EFKA 7701 | M8 PR 48:4 | EFKA 7731 | <25° C. |
| Ex. 3 | Y5 PY 185 | Synthetic dispersant (1) | M1 PR 48:4 | Synthetic dispersant (1) | >25° C. |
| Ex. 4 | Y6 PY 185 | TEGO Disper 685 | M6 PR 48:4 | TEGO Disper 685 | <25° C. |
| Ex. 5 | Y7 PY 185 | BYK168 | M7 PR 48:4 | BYK168 | >25° C. |

(Note)
Cyan ink used C1, black ink used K1.

Reflection density and saturation (C) of sample prints produced by the ink sets of Examples 2 to 5 were similarly measured using a colorimeter (SpectroEye, Xrite). The results thus obtained are shown in Table 20 The ink set of the present invention showed good reflection density and saturation. The reflection density and the saturation were slightly better when the polymeric dispersant had a Tg of no greater than 25° C. than when it was 25° C. or higher.

TABLE 20

| Ink set | | | | Dispersant Tg | Yellow 100% | | Magenta 100% | | Red 100% | |
|---|---|---|---|---|---|---|---|---|---|---|
| Yellow | | Magenta | | | Reflection density | Saturation | Reflection density | Saturation | Reflection density | Saturation |
| Ex. 2 | Y1 PY 185 | M8 | PR 48:4 | <25° C. | 1.9 | 106 | 2.2 | 83 | 2.4 | 108 |
| Ex. 3 | Y5 PY 185 | M1 | PR 48:4 | >25° C. | 1.8 | 104 | 2.1 | 82 | 2.1 | 105 |
| Ex. 4 | Y6 PY 185 | M6 | PR 48:4 | <25° C. | 1.9 | 106 | 2.2 | 83 | 2.4 | 108 |
| Ex. 5 | Y7 PY 185 | M7 | PR 48:4 | >25° C. | 1.8 | 104 | 2.1 | 82 | 2.1 | 105 |

(Note)
Cyan ink used C1, black ink used K1.

(Preparation of Synthetic Dispersants)

Three types of basic polymeric dispersants were produced as follows and used for dispersion of the pigments.

A nitrogen-flushed 3-necked flask was charged with a monomer mixture of amine monomer 1 (8.0 g), oligomer 1 (16.0 g), and methyl ethyl ketone (30.0 g) and heated to 65° C. while stirring using a stirrer and making nitrogen flow into the flask. Subsequently, the two steps below were carried out.

First step: only 60 mg of V-65 was added to the mixture and stirring was carried out for 1 hour while heating at 65° C.
Second step: only 60 mg of V-65 was added to the mixture and stirring was carried out for a further 1 hour while heating at 65° C.

The reaction solution thus obtained was poured into 1,000 mL of hexane while stirring, and the precipitate thus formed was heated and dried, thus giving synthetic dispersant (1).

Synthetic dispersants (2) and (3) were produced as polymeric dispersants having different molecular weights by the same procedure except that the amount of V-65 added and the heating time were changed as appropriate.

The weight-average molecular weight (polystyrene basis) of each polymer was measured by GPC, and the results are shown in Table 15.

The compounds used as starting materials were as follows
Amine monomer 1: 3-dimethylaminopropylacrylamide (Kohjin Co., Ltd.)
Oligomer 1: poly(methyl methacrylate) macromonomer having methacryloyl group at terminal, product name: AA-6 (Toagosei Co., Ltd.)
V-65: 2,2'-azobis(2,4-dimethylvaleronitrile) (Wako Pure Chemical Industries, Ltd.)

(Pigment Concentrations of Yellow and Magenta Inks)

Of the formulations described in Table 21 and Table 22 below, the components other than the pigment were stirred in a mixer manufactured by SILVERSON (10 to 15 minutes, 2,000 to 3,000 rpm), thus giving a uniform transparent liquid. The yellow pigment dispersion produced above was added to this transparent liquid and stirring was carried out (10 to 20 minutes, 2,000 to 3,000 rpm), thus giving yellow inks Y1, Y8, and Y9 and magenta inks M1, M9, and M10. The inks thus prepared were used after filtering using a 1.5 µm filter (PROFILE STAR PALL).

TABLE 21

| | | Y1 | Y8 | Y9 |
|---|---|---|---|---|
| Monomer | DPGDA | 53.0 | 54.5 | 49.5 |
| | TPGDA | 10.0 | 10.0 | 10.0 |
| | PEA | 4.5 | 4.5 | 4.5 |
| | CTFA | 4.5 | 4.5 | 4.5 |
| Resin | Elvacite 2013 | 1.4 | 1.4 | 1.4 |
| | PARALOID ™ DM-55 | 2.0 | 2.0 | 2.0 |
| Initiator | Irgacure 184 | 3.7 | 3.7 | 3.7 |
| | TPO | 7.8 | 7.8 | 7.8 |
| | Benzophenone | 3.7 | 3.7 | 3.7 |
| Inhibitor | UV12 | 0.3 | 0.3 | 0.3 |
| Surfactant | Byk 307 | 0.1 | 0.1 | 0.1 |
| Pigment dispersion | PY 185 dispersion YM1 | 9.0 | 7.5 | 12.5 |

TABLE 22

|  |  | M1 | M9 | M10 |
|---|---|---|---|---|
| Monomer | DPGDA | 52.0 | 54.5 | 49.5 |
|  | TPGDA | 10.0 | 10.0 | 10.0 |
|  | PEA | 4.5 | 4.5 | 4.5 |
|  | CTFA | 4.5 | 4.5 | 4.5 |
| Resin | Elvacite 2013 | 1.4 | 1.4 | 1.4 |
|  | PARALOID ™ DM-55 | 2.0 | 2.0 | 2.0 |
| Initiator | Irgacure 184 | 3.7 | 3.7 | 3.7 |
|  | TPO | 7.8 | 7.8 | 7.8 |
|  | Benzophenone | 3.7 | 3.7 | 3.7 |
| Inhibitor | UV12 | 0.3 | 0.3 | 0.3 |
| Surfactant | Byk 307 | 0.1 | 0.1 | 0.1 |
| Pigment dispersion | PR 48:4 dispersion MM1 | 10.0 | 7.5 | 12.5 |

Examples 6 and 7

A commercially available inkjet printer (LuxelJet UV350GTW, Fujifilm Corporation) was charged with the inks produced as above in the combinations shown in Table 23 below, and print samples were produced using them. The prints employed yellow 100%, magenta 100%, cyan 100%, black 100%, red 100%, blue 100%, and green 100%. As a substrate, a white corrugated cardboard was used.

100% refers to the conditions for the maximum amount of ink obtained when printing is carried out in accordance with printing conditions for the KI ink series (KI867, KI215, KI052, Fujifilm Speciality Ink Systems), which are standard inks for the printer.

Reflection density and saturation were measured for sections of each of yellow, magenta, and red hues, and the results below were obtained. It was confirmed that both Examples 6 and 7 gave an evaluation result in a range that had no problem in practice.

TABLE 23

| Ink set | | | | Yellow 100% | | Magenta 100% | | Red 100% | |
|---|---|---|---|---|---|---|---|---|---|
| Yellow | | Magenta | | Reflection density | Saturation | Reflection density | Saturation | Reflection density | Saturation |
| Ex. 1 | Y1 PY 185 1.8 wt % | M1 | PR 48:4 2.0 wt % | 1.9 | 106 | 2.2 | 83 | 2.3 | 107 |
| Ex. 6 | Y8 PY 185 1.8 wt % | M9 | PR 48:4 1.5 wt % | 1.8 | 101 | 2.1 | 80 | 2.1 | 105 |
| Ex. 7 | Y9 PY 185 2.5 wt % | M10 | PR 48:4 2.5 wt % | 2.0 | 109 | 2.3 | 85 | 2.4 | 109 |

What is claimed is:

1. A radiation-curable inkjet ink set comprising
a yellow ink comprising C.I. Pigment Yellow 185 at 1.5 to 2.5 mass %, and
a magenta ink comprising C.I. Pigment Red 48:4 at 1.5 to 2.5 mass %,
wherein the yellow ink further comprises a polymeric dispersant having a weight-average molecular weight of 15,000 to 45,000 and an amine value of 35 to 45 mg KOH/g, and
the yellow ink and the magenta ink each further comprise a polysiloxane-based surfactant at 0.1 to 3 mass %.

2. The ink set according to claim 1, wherein the magenta ink further comprises a polymeric dispersant having a weight-average molecular weight of 15,000 to 70,000 and an amine value of 15 to 45 mg KOH/g.

3. The ink set according to claim 1, wherein the polymeric dispersant in the yellow ink and/or the magenta ink has a glass transition temperature (Tg) of no greater than 25° C.

4. The ink set according to claim 1, wherein both the yellow ink and the magenta ink comprise at least one type of difunctional monomer selected from the group consisting of 1,6-hexanediol diacrylate (HDDA), 1,9-nonanediol diacrylate (NDDA), dipropylene glycol diacrylate (DPGDA), neopentyl glycol diacrylate (NPGPODA), and tripropylene glycol diacrylate (TPGDA), and the sum total of the difunctional monomer is at least 40 mass % of the total amount of each color ink.

5. The ink set according to claim 1, wherein both the yellow ink and the magenta ink comprise at least one type of monofunctional monomer selected from the group consisting of phenoxyethyl acrylate (PEA), octadecyl acrylate (ODA), isodecyl acrylate (IDA), and cyclic trimethylolpropaneformal acrylate (CTFA), and the sum total of the monofunctional monomer is 5 to 30 mass % of the sum total of the difunctional monomer in each color ink.

6. The ink set according to claim 1, wherein both the yellow ink and the magenta ink comprise DPGDA and/or TPGDA as a difunctional monomer and PEA and/or CTFA as a monofunctional monomer.

7. The ink set according to claim 1, wherein both the yellow ink and the magenta ink comprise DPGDA and TPGDA as a difunctional monomer.

8. The ink set according to claim 1, wherein both the yellow ink and the magenta ink comprise CTFA as a monofunctional monomer.

9. The ink set according to claim 1, wherein both the yellow ink and the magenta ink comprise an inactive methyl methacrylate homopolymer and/or copolymer.

10. The ink set according to claim 1, wherein it is for corrugated cardboard substrate printing.

11. An inkjet recording method comprising
1) a discharge step of discharging the yellow ink and/or the magenta ink of the ink set according to claim 1 above a substrate from an inkjet recording head, and
2) a curing step of curing the discharged ink by irradiation with actinic radiation.

12. The inkjet recording method according to claim 11, wherein the substrate is a corrugated cardboard.

13. The ink set according to claim 7, wherein the sum total of DPGDA and TPGDA is 40 to 80 mass % of the total amount of each color ink.

14. The ink set according to claim 1, wherein both the yellow ink and the magenta ink comprise an acylphosphine compound, an α-hydroxyacetophenone compound and a benzophenone compound as radical polymerization initiators.

* * * * *